(No Model.)

G. RUNDLE.
GRAPPLE HAY FORK.

No. 254,053.      Patented Feb. 21, 1882.

Witnesses.
Philip E. Raque
J. B. Thurston

Inventor.
George Rundle
By his attorney
M. Randolph

UNITED STATES PATENT OFFICE.

GEORGE RUNDLE, OF PALMYRA, WISCONSIN.

GRAPPLE HAY-FORK.

SPECIFICATION forming part of Letters Patent No. 254,053, dated February 21, 1882.

Application filed February 25, 1881. (No model.)

*To all whom it may concern:*

Be it known that I, GEORGE RUNDLE, of Palmyra, in the county of Jefferson and State of Wisconsin, have invented a new and useful Improvement in Grapple Hay-Forks; and I hereby declare the following to be a full and clear description thereof.

This invention relates to an improvement in that class of hay-forks which are used for grappling and loading or unloading or moving hay or similar material in large quantities by means of horse or other suitable power.

The invention will readily be understood by reference to the accompanying drawings, of which—

Figure 1:
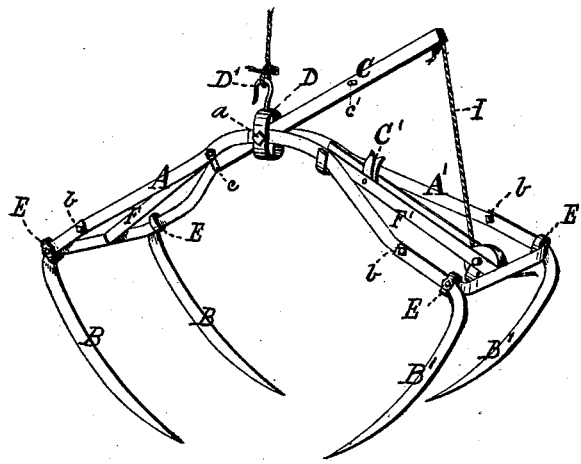
Figure 2:
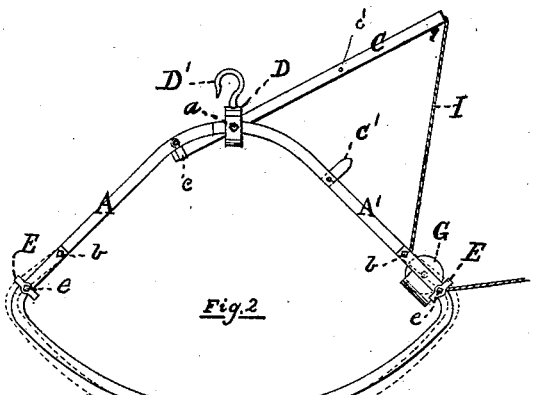
Figure 3:
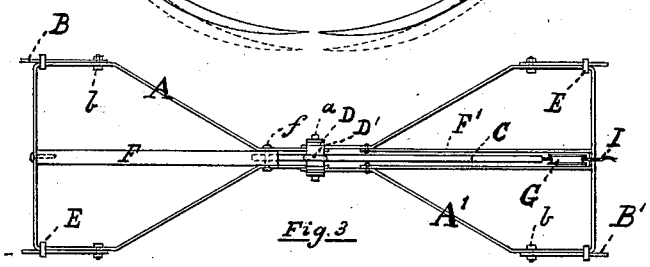
Figure 4:
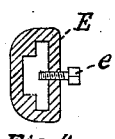

Figure 1 is a perspective view of one of the improved hay-forks, showing the points of the teeth partly open. Fig. 2 is a side elevation of the improved fork, showing the teeth closed together. Fig. 3 is a general plan of the fork. Fig. 4 is a detailed view of one of the adjusting-slides for securing the teeth in place.

This fork is formed of three general parts—viz., two pairs of metallic frames or head-pieces, A A', to which are attached two pairs of teeth, B B', and an operating-lever, C.

The frames or head-pieces A A' are preferably made of bar-iron of proper size and bent around in the shape shown in Figs. 1 and 3, so as to form a kind of loop, to the exterior projecting ends of which the teeth B B' are attached in the manner hereinafter described. The upper ends of these head-pieces A A' are slightly curved downward, as shown in Figs. 1 and 2, so as to give the proper direction and grasp for the teeth B B', the said upper ends of the frame-pieces A A', or rather the ends of the bars forming the frame-pieces, are made to overlap each other, and are assembled together by means of the transverse pin $a$, on which pin the frame-pieces have a free vertical movement up and down, as on a hinge-joint, so as to allow the fork-teeth to open and close as desired, and as hereinafter explained. The assembling-pin $a$ also connects the rake-heads A A' to the clevis-band D, which is attached to and held up by the swivel-hook D', to which is attached the hoisting-rope, by which the fork is raised or lowered from any arm or support, to which the fork may be readily attached when required for use. As is clearly shown in Fig. 1, the ends of the bars forming the rake-head pass freely through the clevis-band D, so as to be allowed a free vertical play therein.

The teeth B B' will preferably be made of flat bar-steel drawn down to properly-sharpened points on their outer ends, as shown in Figs. 1 and 2, while near the heel of each tooth it will be turned over into somewhat of an L-shaped form, as is also shown in Figs. 1 and 2, and near the upper end of each tooth it will be secured to the side of the frame A or A', as the case may be, by means of a small screw-bolt, $b$, which passes through both the tooth-piece and the fork-head, and permits the tooth to swing up and down on it as on a pivot, for the purposes of adjusting the tooth to any desired position. Near the bend of the tooth-piece it passes through a slide-plate, E, which embraces both the tooth-piece and the fork-head, and holds them together, securely as to lateral motion and adjustably as to vertical motion, a set-screw, $e$, which is threaded in the piece E, being arranged to press against the metal of one of the parts A A' or B B', so as to fix the teeth in any desired position with reference to the head-piece, as is shown by the full and dotted lines in Fig. 2. The slide-piece E is shown in detail in Fig. 4, and the smaller part of the opening is intended to fit snugly one of the parts—that is, either the fork-head or the fork-tooth—and the other part of the said opening will embrace the other one of the said pieces, which may move vertically therein until arrested by the set-screw $e$, which will be arranged to screw against the contained piece, and so hold the parts in place. The ends of the larger slot or mortise of the piece E will furnish a stop for the limit of the motion of the tooth adjustment.

There will be a wooden piece, F, placed midway between the two sides of the head-bars A by means of suitable wood-screws, and the upper end of the said piece F is secured to the upper part of the pieces A by means of the transverse bolt $f$. A similar piece, F', may be similarly disposed in and secured to the head parts or bars of A'; or the piece F' may be made in two parts, so as to receive the grooved sheave G between them; or a side bar of iron may be bent into the proper form to receive the said sheave G and the said side bar bolted to the side of the piece F'. The pieces F F' will furnish convenient parts by which a person can lift and handle the fork.

A trip-lever, C, preferably made of wood, will be passed through the center opening of the clevis D, between the bars A A', and a transverse hole through it will receive the bolt *a*, which will pass through it, as well as the parts already described, and form a fulcrum on which the said lever C will vibrate up and down, as required for the operation of the fork.

The shorter arm of the lever C, which will be about one-third of the entire length of the said lever, will extend inwardly and under the central piece F, to which it may be attached by a bolt passing through the lever or through an iron strap, *c*, attached to the end of the said lever, as shown in Fig. 2; but if the lever is so attached to the fork-head, the assembling-bolt at this point must pass through a slot, either in the piece F or the lever or its band *c*, so as to allow the longitudinal movement of the parts necessary at this point for the opening and closing of the fork. It will be sufficient, however, for the lever to rest against the bottom of the piece F, without being hinged or attached to it. The outer end of the lever will extend above and beyond the fork-head, as shown in Fig. 2, and a trip cord or rope, I, will be attached to its outer end, and pass thence down to, under, and around the grooved sheave G, which is journaled in the central bar F', or in a piece fixed thereto, as above described. The outer or free end of the trip-cord I will be held by the operator, who will pull upon it when the fork is to be unloaded, and the action of pulling on this cord will open both sides of the fork simultaneously, by reason of the inner end of the lever pressing up on one side of the fork-head, and the cord I, acting under the sheave G, will lift it and the part of the fork-head to which it is attached.

A transverse pin, *c'*, will pass through the lever C, near its outer end, and project beyond the sides thereof a short distance—say one or two inches—and when the lever is drawn down by the cord I to the limit of its motion in that direction this projecting pin *c'* will catch under the automatically-operating latch C', which is pivoted to the central bar F, or to an attachment fixed to said bar, and in this manner the fork will be held open while being lowered for a new load; but when the fork shall have been lowered and is just ready to grasp a new load the operator will then with one hand release the lever C from the latch C', so as to allow the fork to immediately close upon its load.

The clevis D should be constructed so as to form a stop for the bars of the heads A A', in order to prevent the fork-teeth closing too far.

Having described my invention, I claim—

1. The fork-heads A A', formed of metallic bars, bent or shaped as shown and described, and pivoted on a central assembling-pin, *a*, in combination with the adjustable teeth B B', the whole operating to form a grapple hay-fork, substantially as described and set forth.

2. The fork-teeth B B' and the fork-head A A', adjustably combined together by means of the pivot-pins *b*, sliding plates or clamps E, and set-screws *e*, substantially as described and set forth.

3. The lever C, provided with a transverse pin, *c'*, near its central part, arranged to be engaged by an automatic spring-latch, C', secured to the central bar, F, of the rake-head, so as to hold or release the parts as required by the operation of the fork, substantially as described and set forth.

GEORGE RUNDLE.

Witnesses:
R. J. WASHBURN,
ROBERT LOEWE.